(12) United States Patent
Moros Ortiz et al.

(10) Patent No.: US 12,126,616 B2
(45) Date of Patent: *Oct. 22, 2024

(54) GENERATING AN EVALUATION-MASK FOR MULTI-FACTOR AUTHENTICATION

(71) Applicant: International Business Machines Corporation, Armonk, NY (US)

(72) Inventors: Jorge Andres Moros Ortiz, Melbourne (AU); Bruno de Assis Marques, Point Cook (AU); Suman Sedai, Hughesdale (AU)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/813,483

(22) Filed: Jul. 19, 2022

(65) Prior Publication Data

US 2022/0353258 A1 Nov. 3, 2022

Related U.S. Application Data

(63) Continuation of application No. 17/121,889, filed on Dec. 15, 2020, now Pat. No. 11,425,121.

(51) Int. Cl.
```
H04L 9/40       (2022.01)
G06F 21/32      (2013.01)
G06F 21/40      (2013.01)
```
(52) U.S. Cl.
CPC ......... *H04L 63/0861* (2013.01); *G06F 21/32* (2013.01); *G06F 21/40* (2013.01); *H04L 63/102* (2013.01); *H04L 63/105* (2013.01)

(58) Field of Classification Search
CPC . H04L 63/0861; H04L 63/102; H04L 63/105; H04L 9/3271; H04L 63/08;
(Continued)

(56) References Cited

U.S. PATENT DOCUMENTS

| 6,069,622 A | 5/2000 | Kurlander |
| 7,623,970 B2 | 11/2009 | Kondo |

(Continued)

FOREIGN PATENT DOCUMENTS

| CN | 107909621 A | 4/2018 |
| CN | 111242837 A | 6/2020 |

(Continued)

OTHER PUBLICATIONS

Almuairfi et al., "A novel image-based implicit password authentication system (IPAS) for mobile and non-mobile devices", ScienceDirect, Mathematical and Computer Modelling vol. 58, Issues 1-2, Jul. 2013, pp. 108-116, 23 pages.

(Continued)

*Primary Examiner* — Sm A Rahman
(74) *Attorney, Agent, or Firm* — Joseph P. Curcuru

(57) ABSTRACT

In an approach to improve multi-factor authentication embodiments generate an evaluation-mask over one or more modified items on a modified image created by a generative adversarial network (GAN). Further, embodiments create a scoring grid by comparing an original image with the modified image to identify different pixels between the original image and the modified image, and overlay the evaluation-mask over the identified different pixels on the modified image. Embodiments display the modified image as a multi-factor authentication prompt to a user and prompt the user to provide a response that identifies one or more modifications in the modified image. Additionally, embodiments compute an evaluation score based on a comparison of the response from the user with the evaluation-mask, to validate the response from the user, and authenticate and grant the user access to data or other resources if the evaluation score meets or exceeds a predetermined threshold.

20 Claims, 3 Drawing Sheets

(58) Field of Classification Search
CPC ......... H04L 63/10; G06F 21/32; G06F 21/40; G06F 21/31
See application file for complete search history.

(56) References Cited

U.S. PATENT DOCUMENTS

| | | | |
|---|---|---|---|
| 7,779,457 B2 | 8/2010 | Taylor | |
| 7,836,050 B2* | 11/2010 | Jing | H04N 21/252 382/305 |
| 7,836,492 B2 | 11/2010 | Srinivasan | |
| 8,037,316 B2 | 10/2011 | Gudorf | |
| 8,347,103 B2 | 1/2013 | Jones | |
| 8,812,861 B2 | 8/2014 | Osborn | |
| 9,275,303 B2 | 3/2016 | Cvetkovic | |
| 11,677,897 B2* | 6/2023 | Zhao | G06V 10/56 382/156 |
| 2007/0118745 A1 | 5/2007 | Buer | |
| 2008/0028205 A1 | 1/2008 | Yang | |
| 2010/0043062 A1 | 2/2010 | Alexander | |
| 2014/0282959 A1 | 9/2014 | Mechaley, Jr. | |
| 2015/0340016 A1 | 11/2015 | Lablans | |
| 2018/0101674 A1 | 4/2018 | Leddy | |
| 2019/0102528 A1 | 4/2019 | Beacham | |
| 2020/0184053 A1 | 6/2020 | Kursun | |
| 2020/0242771 A1 | 7/2020 | Park | |
| 2021/0117529 A1 | 4/2021 | Zamora Martínez | |
| 2021/0227152 A1 | 7/2021 | Zhang | |

FOREIGN PATENT DOCUMENTS

| | | | |
|---|---|---|---|
| CN | 111489412 A | 8/2020 | |
| EP | 3076320 B1 | 8/2020 | |
| EP | 3739515 A1 | 11/2020 | |
| WO | 2014039763 A1 | 3/2014 | |
| WO | 2016055835 A1 | 4/2016 | |

OTHER PUBLICATIONS

Cassidy, Mike, "The True Cost of Online Fraud Might Surprise You", Signifyd, Sep. 5, 2018, <https://www.signifyd.com/blog/2018/09/05/true-cost-online-fraud-surprising>, 8 pages.

IBM: List of IBM Patents or Patent Applications Treated as Related. Filed Herewith. 2 pages.

International Search Report and Written Opinion, International Application No. PCT/CN2021/130155, Mailed Feb. 10, 2022, 9 pages.

Moros Ortiz, et al., "Generating an Evaluation-Mask for Multi-Factor Authentication", U.S. Appl. No. 17/121,889, filed Dec. 15, 2020, 30 pages.

Moros Ortiz, et al., "Generating an Evaluation-Mask for Multi-Factor Authentication", International Application No. PCT/CN2021/130155, International Filing Date Nov. 11, 2021, 29 pages.

Nguyen-Phuoc et al., "Hologan: Unsupervised Learning of 3D Representations From Natural Images", International Conference on Computer Vision ICCV 2019, Monkeyoverflow, <https://www.monkeyoverflow.com/#/hologan-unsupervised-learning-of-3d-representations-from-natural-images/>, 12 pages.

Qin, et al., "Coverless Image Steganography Based on Generative Adversarial Network", Mathematics, vol. 8, Issue 9, Article 1394, 2020, 11 pages, https://www.mdpi.com/2227-7390/8/9/1394>.

Shah et al., "Image Based Authentication System", Jan. 2013 Conference: International Conference on Communication Technology 2013, Researchgate, <https://www.researchgate.net/publication/310236116_Image_Based_Authentication_System>, 9 pages.

German Office Action for DE Application No. 112021005672.7, dated Jun. 17, 2024, 6 pages.

* cited by examiner

GENERATING AN EVALUATION-MASK FOR MULTI-FACTOR AUTHENTICATION

BACKGROUND OF THE INVENTION

The present invention relates generally to the field of multi-factor authentication, and more particularly to creating media files as a means of multi-factor authentication.

A generative adversarial network (GAN) is a machine learning (ML) model in which two neural networks compete with each other to become more accurate in their predictions. GANs typically run unsupervised and use a cooperative zero-sum game framework to learn. The two neural networks that make up a GAN are referred to as the generator and the discriminator. The generator is a convolutional neural network, and the discriminator is a deconvolutional neural network. The goal of the generator is to artificially manufacture outputs that could easily be mistaken for real data. The goal of the discriminator is to identify which outputs it receives have been artificially created. Essentially, GANs create their own training data. As the feedback loop between the adversarial networks continues, the generator will begin to produce higher-quality outputs and the discriminator will become better at flagging data that has been artificially created.

The first step in establishing a GAN is to identify the desired end output and gather an initial training dataset based on those parameters. This data is then randomized and entered as an input into the generator until the generator acquires basic accuracy in producing outputs. The generated images are then fed into the discriminator along with actual data points from the original concept. The discriminator filters through the information and returns a probability between 0 and 1 to represent each image's authenticity (1 correlates with real and 0 correlates with fake). These values are then manually checked for success and repeated until the desired outcome is reached. The core idea of a GANs is based on the "indirect" training through the discriminator, which itself is also being updated dynamically. Essentially, this means that the generator is not trained to minimize the distance to a specific image, but rather to fool the discriminator. This enables the model to learn in an unsupervised manner. GANs are becoming a popular ML model for online retail sales because of their ability to understand and accurately re-create visual content.

SUMMARY

Embodiments of the present invention disclose a method, a computer program product, and a system for multi-factor authentication, the computer-implemented method comprising: generating an evaluation-mask over one or more modified items on a modified image, wherein the modified image is created by a generative adversarial network (GAN); creating a scoring grid by comparing an original image with the modified image to identify different pixels between the original image and the modified image; overlaying the evaluation-mask over the identified different pixels on the modified image; displaying the modified image as a multi-factor authentication prompt to a user, wherein the user is prompted to provide a response that identifies one or more modifications in the modified image; computing an evaluation score based on a comparison of the response from the user with the evaluation-mask, to validate the response from the user; and responsive to the evaluation score meeting or exceeding a predetermined threshold, authenticating the user and granting the user access to data or other resources.

DETAILED DESCRIPTION

Figure 1:
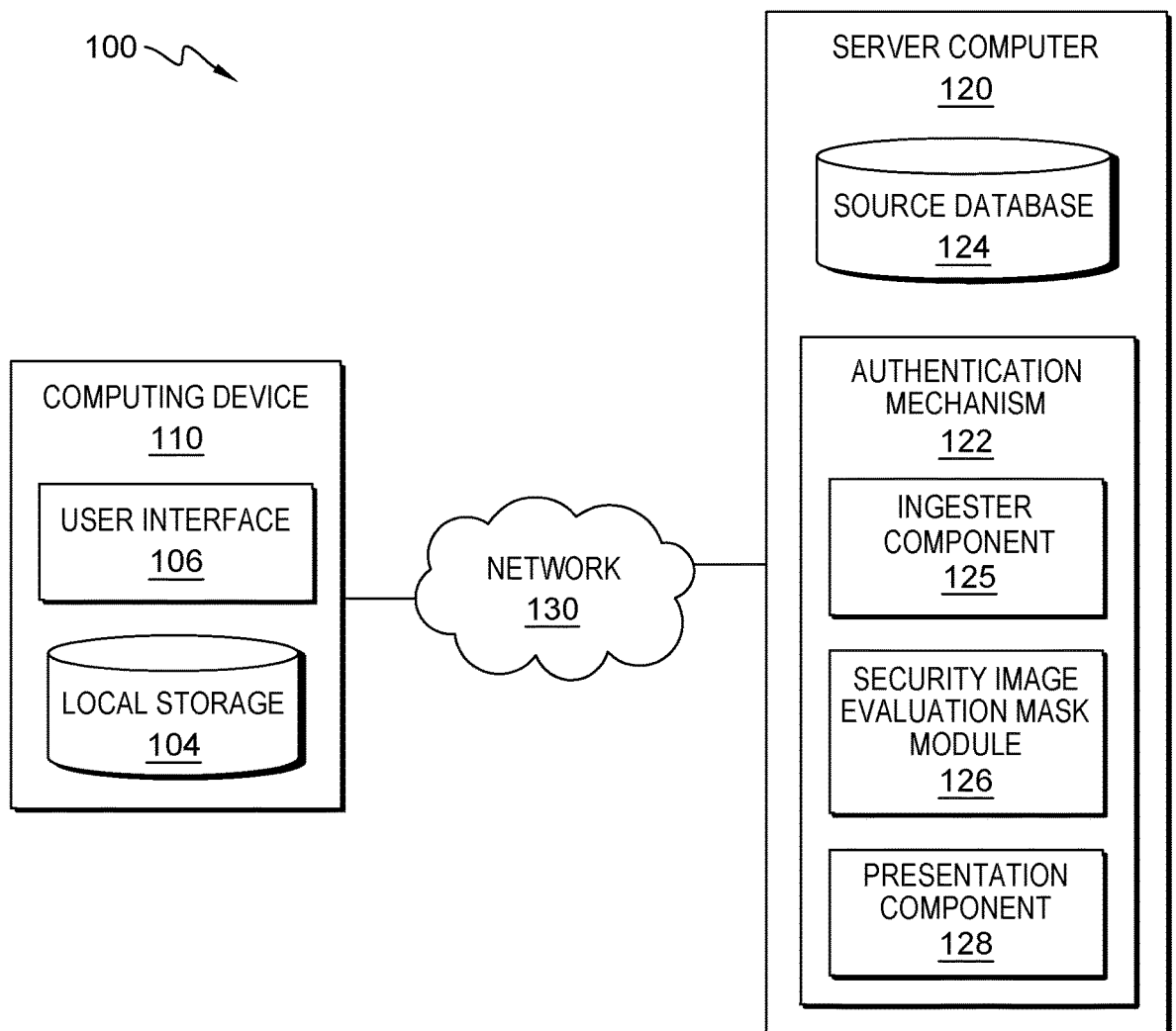
FIG. 1 is a functional block diagram illustrating a distributed data processing environment, in accordance with an embodiment of the present invention.

Embodiments of the present invention improve the art of online account security by executing a second factor authentication. More specifically, embodiments of the present invention, improve the current art by, generating an evaluation-mask (i.e., a mask) over modified items on a GAN created media file to act as a multi-factor authentication. Embodiments of the present invention may be based on media files known to the user (e.g., a personal media file) and may test a user's prior knowledge about the original media file. A personal media file may be a family photograph, an image of the users first car or home, and/or any personalized image or video known in the art. Embodiments of the present invention improve the current art of user authentication by not require personal data from the user like a date of birth, age, or home address, instead, embodiments of the present invention use knowledge about a media file as the metric to authenticate the user. Embodiments of the present invention compare an original media file with the modified media file to identified differences based on pixel changes. By comparing pixel to pixel differences embodiments of the present invention are able to identify such differences as 'target areas' to overlay a mask and serve as validation points on a media file. Embodiments of the present invention generate an evaluation-mask over modified items on a GAN created media file as means of a multi-factor authentication. Embodiments of the present invention improve the art by creating authentication puzzles using GAN as a new form of multi-factor authentication applicable on digital experiences and across screen-based devices (e.g., computing devices).

Embodiments of the present invention create a scoring grid by comparing an original image with a GAN modified version of the image (i.e., modified image), to identify different pixels between the original image and the modified image and overlay a mask over the identified different areas. Embodiments of the present invention label the identified different areas as 'different areas'. Upon the modified image being presented to the user, embodiments of the present invention receive a user's response via touch, drawing, or clicking through a user interface, wherein the received user responses (i.e., entered information) is compared with the mask (pixel areas to pixel areas), to calculate/validate the user's inputs. Embodiments of the present invention verify a user's prior knowledge of the original media file validates a user's response by comparing the original media file against the identified different areas in the user's response in relation to the modified media file, wherein the user's responses is validated if the user's response is within a predetermined acceptable limit. For example, embodiments of the present invention will validate a user if the user's response selects/identifies 98% of the different areas in the modified image.

Implementation of embodiments of the invention may take a variety of forms, and exemplary implementation details are discussed subsequently with reference to the Figures (i.e., FIG. 1-FIG. 3).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to the automated feedback and authentication mechanism 122. Computing device 110, via user interface 106, may enable a user and/or a client to interact with authentication mechanism 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of authentication mechanism 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, authentication mechanism 122 is executed on server computer 120. In other embodiments, authentication mechanism 122 may be executed on computing device 110. In various embodiments of the present invention, not depicted in FIG. 1, authentication mechanism 122 may execute on a plurality of server computers 120 and/or on a plurality of computing devices 110. In some embodiments, authentication mechanism 122 may be located and/or executed anywhere within distributed data processing environment 100 as long as authentication mechanism 122 is connected to and/or communicates with, computing device 110, and/or server computer 120, via network 130.

In various embodiments of the present invention, authentication mechanism 122 is a multi-factor authentication mechanism. Authentication mechanism 122 may comprise and execute a GAN model. In the depicted embodiment, authentication mechanism 122 comprises ingester component 125, security image evaluation-mask module (evaluation module) 126, and presentation component 128. In other embodiments, ingester component 125, evaluation module 126, and/or presentation component 128 may each be executed on computing device 110. In various embodiments of the present invention, not depicted in FIG. 1, ingester component 125, evaluation module 126, and/or presentation component 128 may each execute on a plurality of server computers 120 and/or on a plurality of computing devices 110. In some embodiments, ingester component 125, evaluation module 126, and/or presentation component 128 may each be located and/or executed anywhere within distributed data processing environment 100 as long as ingester component 125, evaluation module 126, and/or presentation component 128 are connected to and/or communicates with authentication mechanism 122, computing device 110, and/or server computer 120, via network 130.

Authentication mechanism 122 may receive uploaded media files (e.g., digital photographs (i.e., photos)/image) and metadata from a user or database (i.e., local storage 104 and/or shared storage 124), via ingester component 125. In some embodiments of the present invention, the received media files (e.g., user photos) may be photos that are personal and/or associated to the user. The media files and metadata may be obtained from one or more social media sites and/or open source websites on internet, wherein authentication mechanism 122, via a GAN model, may use the obtained media files to generate modified media files. In other embodiments, authentication component, via a GAN model, uses other available images of a predetermined location to generate modified media files. Metadata may comprise: location of the photograph, name of location, time of the year, timestamp of the photo, file size, amount of pixels, and/or any descriptive, structural and administrative metadata known in the art. Media files may be photos, videos, and/or any other types of media files known in the art. In various embodiments of the present invention, the received and/or retrieved metadata is associated with a particular media file. In some embodiments of the present invention, authentication mechanism 122 is linked or synced to one or more of a user's social media profiles.

Authentication mechanism 122 may possess user enabled access to search for data or other resources, in one example, photos and metadata from within the linked one or more user social media profiles. For example, authentication mechanism 122 retrieves the user's current social media profile picture and creates a modified image to present to the user for authentication, wherein the user is prompt to identify/select the differences in the modified image. In various embodiments of the present invention, authentication mechanism 122 executes an internet search, via one or more search engines, to locate media files (e.g., photos) and metadata. In various embodiments of the present invention, authentication 122 receives media files directly from the user.

Authentication mechanism 122, via evaluation module 126, may generate an altered/modified media file based on an original or uploaded image/photo. In various embodiments of the present invention, evaluation module 126 executes two steps: (i) changing the original image (e.g., an uploaded user media file) using the GAN model, and (ii) creating and placing a mask over the modified media file to evaluate the user's answer (i.e., response), wherein the mask holds information about where the changes have been made to the original media file, wherein the mask is not visible to the user being authenticated. In various embodiments of the present invention, authentication mechanism 122, via evaluation module 126, changes the people, fashion, age, color and pixels in the users uploaded image, generates an modified second image based on the uploaded image, compares the two images and creates and places a mask over the areas in the modified second image that were modified from the uploaded image.

For example, a user uploads a photograph of a local park, wherein the photograph of the park comprises pedestrians walking dogs, trees, pedestrians roller skating, birds flying in the air, and a pond. In this example, authentication mechanism 122, via ingester component 125 and a GAN model, generate a modified image of the uploaded photograph of the park, wherein the modified image removes the dogs being walked, adds birds in the tree, changes color of the leaves from green to yellow, adds ducks to the pond, changes the vest color of one of the pedestrians, and removes the birds flying in the sky and pixilates area where the birds were removed. In this example, authentication mechanism 122, via evaluation module 126, generates and places a mask over the modified image to evaluate the user's responses. In this example, the user is presented the modified image and asked to identify the changes in the modified image, in relation to the uploaded park photograph. As the user selects portions of the modified image, the mask, via evaluation module 126, registers the user's responses and uses the received user responses to calculate a score.

In various embodiments of the present invention, the mask is invisible to the user and its purpose is to serve as an interactive component that the user can click on, via interface 106, and through this interaction evaluation module 126 can determine if the user has accurately selected one or more modifications to the original image in order to prove/validate that the user possesses prior knowledge about the image. In various embodiments of the present invention, authentication mechanism 122 prompts the user to select/identify a predetermined number/amount of changes in a modified media file. For example, a user is prompted to select at least 3 changes in the image.

In various embodiments of the present invention, presentation component 128, via interface 106, displays a modified image and one or more open questions. For example, presentation component 128, via interface 106, presents a modified image and a single open question such as "identify the differences" or "select the changes in the image" to a user. In this example, presentation component 128 prompts the user to click "ok" to proceed. The differences in the modified image may be one or more differences from the original image. Presentation component 128 may record and send the user's interactions with the displayed one or more open questions back to a predetermined instance or to evaluation module 126, wherein, evaluation module 126 executes step two (i.e., security image evaluation). Evaluation module 126 may then compare the user's response(s) with the evaluation-mask to calculate an evaluation score. In various embodiments of the present invention, a plurality of media files (original and/or manipulated) may be needed in some cases to evaluate the user's response(s) more accurately.

Presentation component 128 may assess how accurate a user's response to a challenge (i.e., prompted question) was, wherein accuracy/correctness of a user's response is based on a predetermined threshold. In various embodiments of the present invention, the predetermined threshold can be defined by the user during setup or anytime the user desires through user settings. When assessing the accuracy of the user's response, presentation component 128 may take into account the order of the objects that were selected and the amount of time it took to provide the response.

In various embodiments of the present invention, authentication mechanism 122 broadcasts back the predetermined threshold of identification to the website or mobile application in a binary format. The user's status is either authenticated or not authenticated based on the calculated score of the users one or more responses, wherein the user's status is sent to the website or mobile application the user is interacting with, wherein the website processes the binary result in order to grant or deny access.

In various embodiments of the present invention, authentication mechanism 122 compares images and identified differences, to create puzzles and prevent fraud, wherein the puzzles can be modified media files used to authenticate a user. In various embodiments of the present invention, authentication mechanism 122 adjusts the media file according to user set preferences and accessibility settings. For example, altering the image colors for user's that experience color vision deficiencies. The presentation of the image may be timed, so that the time allotted for the user to identify the differences in the modified data file may be adjusted by enabling the increasing or decreasing of allotted time. In some embodiments the allotted time for the user to identify the differences in the manipulated media file is predetermined.

In various embodiments of the present invention, authentication mechanism 122, via a camera component, not depicted in FIG. 1, executes eye tracking to identify what the user has looked at in order to correlate the user's visual pattern with the user's selections. Authentication mechanism 122 identifies and analysis the items/areas of the media file a user spent time on viewing and the items/areas the user selected to determine a score.

Figure 2:
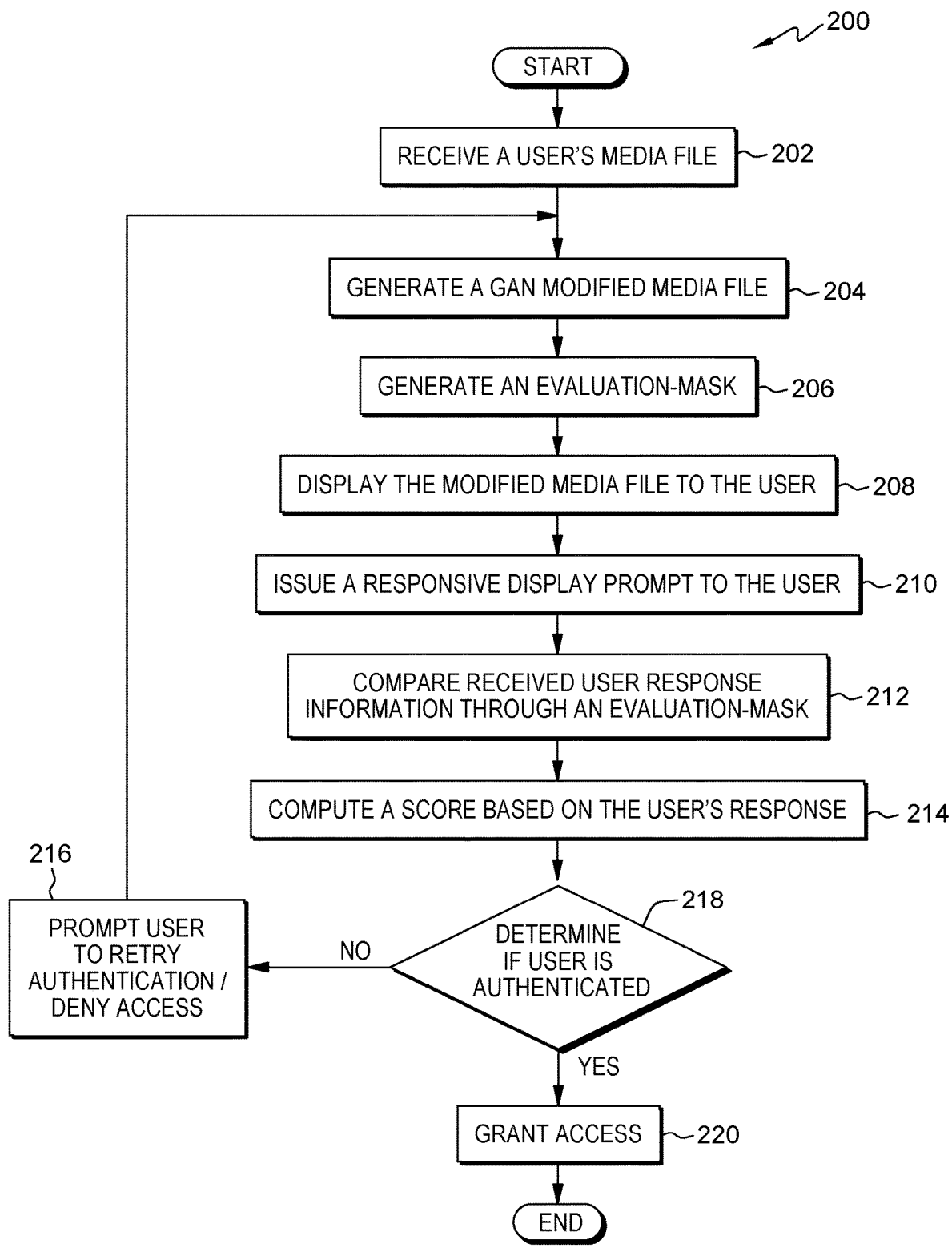
FIG. 2 illustrates operational steps of an authentication mechanism 122, on a server computer within the distributed data processing environment of FIG. 1, for multi-factor authentication, in accordance with an embodiment of the present invention.

FIG. 2 illustrates operational steps of authentication mechanism 122, generally designated 200, in communication with computing device 110, within distributed data processing environment 100 of FIG. 1, for multi-factor authentication, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, authentication mechanism 122 receives a user's media file. In various embodiments of the present invention, authentication mechanism 122 receives one or more media files from a user or retrieves one or more media files from local storage 104 and/or shared storage 124. For example, a user new to a social media site registers an account, wherein the user is asked to upload a security image, and include metadata, such as time of the year, location, city and country (e.g., Flinders Street station, summer). In this example, the user uploads an image of a custom birthday cake the user recently received. In various embodiments of the present invention, authentication mechanism 122 issues display prompts instructing the user to submit new/fresh media after a predetermined amount of time (e.g., weeks, months, etc.).

In step 204, authentication mechanism 122 generates a GAN modified media file. In various embodiments of the present invention, authentication mechanism 122 generates one or more GAN modified media files based on the received one or more user media files. Continuing the example above, a user's account is experiencing a security threat (e.g., attempted hacking). In this example, is authentication mechanism 122 is alerted of the security threat and is triggered into executing a multi-factor authentication. In this example, authentication mechanism 122 retrieves the image the user originally uploaded image (e.g., the custom birthday cake) and metadata, from local storage 104 and/or shared storage 124, and identifies similar images of the same place, different angles, objects, people, lighting from the internet. In various embodiments of the present invention, authentication mechanism 122 edits the original image using a GAN based image alteration model, wherein the edits comprise, but are not limited to: changing objects, people, colors, brightness, peoples ages, changing walls, changing clothes, and fashion in the original image. For example, changing the color of the frosting, changing the name on the cake, changing books on the shelf in the background to plants, reducing the number candles, adding a photograph to the wall behind the cake, and changing the brightness of the candles and room.

In step 206, authentication mechanism 122 generates an evaluation-mask. In various embodiments of the present invention, authentication mechanism 122 executes a pixel to pixel comparison between the original media file and the GAN modified media file's (e.g., modified media file). Authentication mechanism 122, based on the pixel comparison, may identify the areas that are different between the original media file and the modified media file and label the identified different areas as 'differences.' Based on the identified 'differences,' authentication mechanism 122 may overlay one or more masks from the differences, wherein the one or more masks are the evaluation points. In various embodiments of the present invention, authentication mechanism 122 creates one or more scoring grids by comparing an original image with a GAN modified version of the image, to identify different pixels between the original image and the modified image and overlay a mask over the identified 'differences.'

In step 208, authentication mechanism 122 displays the modified media file to a user. In various embodiments of the present invention, authentication mechanism 122, via interface 106, displays one or more modified media files with the mask overlay to the user. Continuing the example above, authentication mechanism 122 will display the modified image with the evaluation-mask (i.e., mask) overlay to the hacker.

In step 210, authentication mechanism 122 issues a responsive display prompt to the user. In various embodiments of the present invention, authentication mechanism 122 issues one or more responsive display prompts to the user, wherein the responsive display prompts are displayed to the user via interface 106. Continuing the example above, when displaying the modified image with the mask over lay to the hacker (i.e., user), authentication mechanism 122 will issue a responsive prompt instructing the hacker to identify the items of the image that have changed by either tapping, drawing, and/or clicking on the items depending on the type of computing device the hacker is using. In various embodiments of the present invention, authentication mechanism 122 leverages HoloGAN (i.e., GAN), enable the conversion from 2D images to 3D by adding depth in the original media file and enable users to rotate the angle of the media file (e.g., modified image) to select items that have been placed (e.g., items behind other objects). The user selection (i.e., selection), based on the responsive prompt, may also be made by first selecting the depth plane and tapping a predetermined object in a selected plane of the media file.

In step 212, authentication mechanism 122 compares the received user response information (i.e., user selection) with the evaluation-mask. In various embodiments of the present invention, authentication mechanism 122 compares the user's selections with the evaluation-mask, in order to calculate evaluation score. For example, continuing the example above, when authentication mechanism 122 receives the hacker's selection(s) then authentication mechanism 122 compares the receive selections with the generated mask to identify if the hacker identified the correct areas on the modified image. In various embodiments of the present invention, a plurality of media files (original and/or manipulated) may be needed in some cases to evaluate the user more accurately.

In step 214, authentication mechanism 122 computes an evaluation score based on the user's response. In various embodiments of the present invention, authentication mechanism 122 computes an evaluation score based on the comparison of the received user response(s) and the evaluation-mask. In some embodiments of the present invention, authentication mechanism 122 computes an evaluation score based on a comparison of the response from the user with the evaluation-mask, to validate the response from the user. In various embodiments of the present invention, authentication mechanism 122 computes a score from multiple attempts in order to deem a successful identification, wherein the multiple attempts comprise a plurality of media files, wherein the plurality of media files are different media files and/or the same media file with different modifications. In various embodiments of the present invention, authentication mechanism 122 computes the evaluation score based on a plurality of response attempts from the user to validate an identification of the user, wherein the plurality of response attempts are based on a plurality of security prompts, each using a different modified image selected from a plurality of modified images.

In step 216, authentication mechanism 122 determines if the user is authenticated. In various embodiments of the present invention, authentication mechanism 122 determines if the user is authenticated based on the computed evaluation score. In various embodiments of the present invention, authentication mechanism 122 broadcasts a binary, authenticated or not authenticated determination, to the platform in order to grant or deny user access to data or other resources. If the user scores within or above a predetermined threshold (Yes step) then authentication mechanism 122 validates and authenticates the user and proceeds to step 220. If the user scores below the predetermined threshold (No step) then authentication mechanism 122 may not validate the user and proceed to step 218.

In step 218, authentication mechanism 122 prompts the user to retry authentication. In various embodiments of the present invention, authentication mechanism 122 denies the user access to the data or other resources and prompts the user to retry authentication, wherein the prompt is a responsive prompt displayed via interface 106. In the depicted embodiment, authentication mechanism 122 may repeat steps 204 through 218 until the user is validated or the predetermined number of attempts is reached, and the account is locked.

In step 220, authentication mechanism 122 grants the user access. In various embodiments of the present invention, authentication mechanism 122 grants the user access to data or other resources based on the evaluation score and authentication, wherein the evaluation score meets or exceeds a predetermined threshold. In various embodiments of the present invention, authentication mechanism 122 issues survey prompt evaluating the difficult and accuracy of the modified media file and authentication process.

Figure 3:
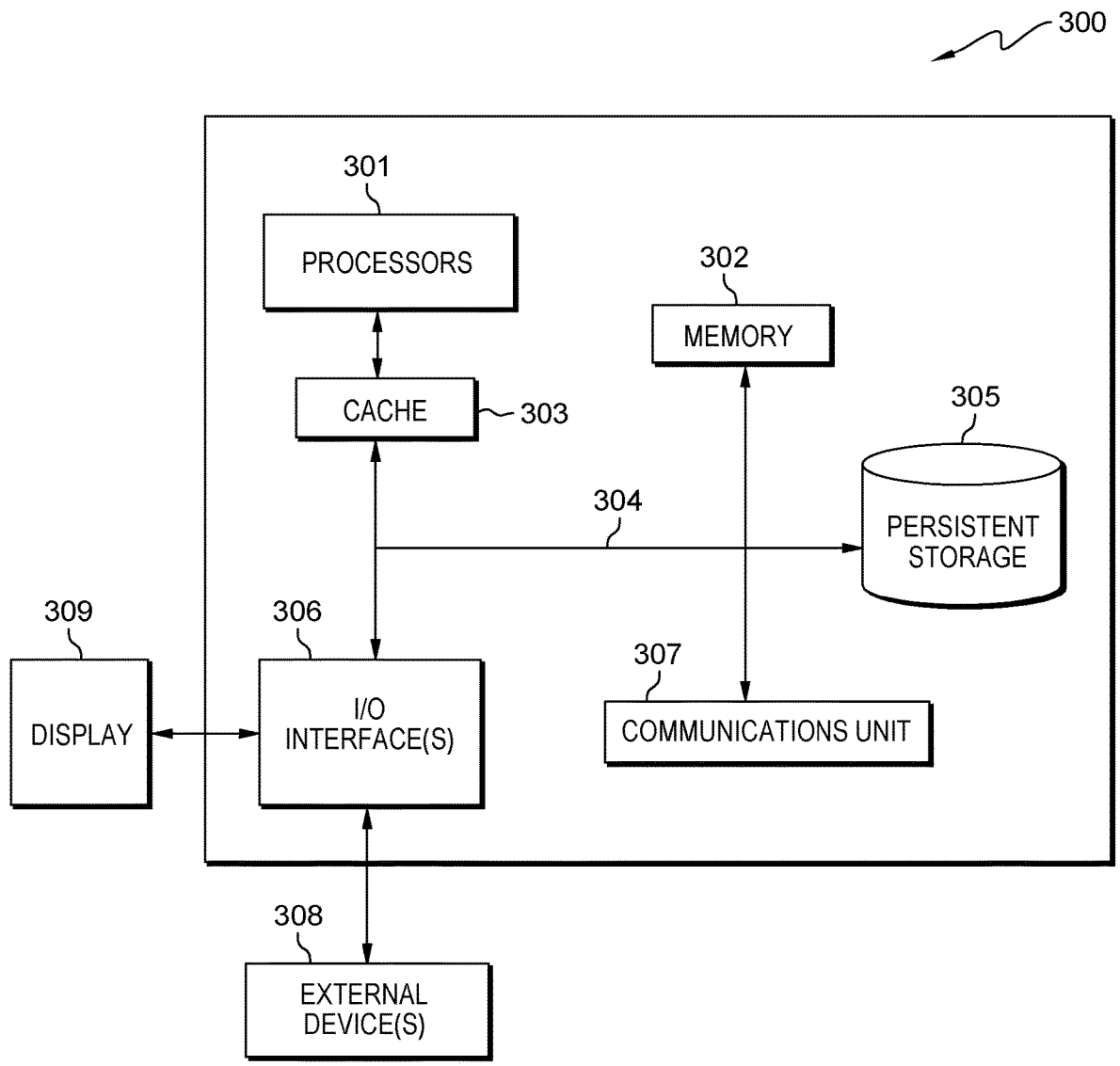
FIG. 3 depicts a block diagram of components of the server computer executing the authentication mechanism within the distributed data processing environment of FIG. 1, in accordance with an embodiment of the present invention.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes authentication mechanism 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for multi-factor authentication, the computer-implemented method comprising:
    generating an evaluation-mask over one or more modified items on a modified image, wherein the modified image is created by a generative adversarial network (GAN);
    creating a scoring grid by comparing an original image with the modified image to identify different pixels between the original image and the modified image;
    overlaying the evaluation-mask over the identified different pixels on the modified image; and
    responsive to receiving an evaluation score that meets or exceeds a predetermined threshold, authenticating a user and granting the user access to data or other resources.

2. The computer-implemented method of claim 1, wherein the comparison of the response from the user with the evaluation-mask comprises:
    comparing pixels in the original image with pixels of the modified image in relation to the response from the user.

3. The computer-implemented method of claim 1, further comprising:
    generating, by the GAN, the modified image from the original image, wherein generating the modified image comprises:
        editing the original image, wherein editing comprises at least one of: changing objects, people, colors, brightness, peoples ages, changing walls, changing clothes, and fashion in the original image.

4. The computer-implemented method of claim 1, wherein the displaying the modified image as a multi-factor authentication prompt to the user further comprises:
    issuing a responsive prompt instructing the user to identify the one or more modified items or areas in the modified image by tapping, drawing, or clicking on the one or more modified items or areas in the modified image.

5. The computer-implemented method of claim 1, further comprising:
    computing the evaluation score based on a plurality of response attempts from the user to validate an identification of the user, wherein the plurality of response attempts are based on a plurality of security prompts, each using a different modified image selected from a plurality of modified images.

6. The computer-implemented method of claim 1, further comprises:
    comparing the response from the user with the evaluation-mask, in relation to one or more modifications to the original image; and
    determining the user is authenticated based on the computed evaluation score, wherein the evaluation score is within or above a predetermined threshold, and wherein a binary authentication determination is broadcast to a platform to grant the user access to the data or other resources.

7. The computer-implemented method of claim 1, further comprising:
    displaying the modified image as a multi-factor authentication prompt to a user, wherein the user is prompted to provide a response that identifies one or more modifications in the modified image; and
    computing an evaluation score based on a comparison of the response from a user and the evaluation-mask, to validate the response from the user.

8. A computer system for multi-factor authentication, the computer system comprising:
    one or more computer processors;
    one or more computer readable storage devices; and
    program instructions stored on the one or more computer readable storage devices for execution by at least one of the one or more computer processors, the stored program instructions comprising:
        program instructions to generate an evaluation-mask over one or more modified items on a modified image, wherein the modified image is created by a generative adversarial network (GAN);
        program instructions to create a scoring grid by comparing an original image with the modified image to identify different pixels between the original image and the modified image;
        program instructions to overlay the evaluation-mask over the identified different pixels on the modified image; and responsive to receiving an evaluation score that meets or exceeds a predetermined threshold, program instructions to authenticate a user and grant the user access to data or other resources.

9. The computer system of claim 8, wherein the comparison of the response from the user with the evaluation-mask comprises:
program instructions to compare pixels in the original image with pixels of the modified image in relation to the response from the user.

10. The computer system of claim 8, further comprising:
program instructions to generate, by the GAN, the modified image from the original image, wherein generating the modified image comprises:
program instructions to edit the original image, wherein editing comprises at least one of: changing objects, people, colors, brightness, peoples ages, changing walls, changing clothes, and fashion in the original image.

11. The computer system of claim 8, wherein the displaying the modified image as a multi-factor authentication prompt to the user further comprises:
program instructions to issue a responsive prompt instructing the user to identify the one or more modified items or areas in the modified image by tapping, drawing, or clicking on the one or more modified items or areas in the modified image.

12. The computer system of claim 8, further comprising:
program instructions to compute the evaluation score based on a plurality of response attempts from the user to validate an identification of the user, wherein the plurality of response attempts are based on a plurality of security prompts, each using a different modified image selected from a plurality of modified images.

13. The computer system of claim 8, further comprises:
program instructions to compare the response from the user with the evaluation-mask, in relation to one or more modifications to the original image; and
program instructions to determine the user is authenticated based on the computed evaluation score, wherein the evaluation score is within or above a predetermined threshold, and wherein a binary authentication determination is broadcast to a platform to grant the user access to the data or other resources.

14. The computer system of claim 8, further comprising:
program instructions to display the modified image as a multi-factor authentication prompt to a user, wherein the user is prompted to provide a response that identifies one or more modifications in the modified image; and
program instructions to compute an evaluation score based on a comparison of the response from the user with the evaluation-mask, to validate the response from the user.

15. A computer program product for multi-factor authentication, the computer program product comprising:
one or more computer readable storage devices and program instructions stored on the one or more computer readable storage devices, the stored program instructions comprising:
program instructions to generate an evaluation-mask over one or more modified items on a modified image, wherein the modified image is created by a generative adversarial network (GAN);
program instructions to create a scoring grid by comparing an original image with the modified image to identify different pixels between the original image and the modified image;
program instructions to overlay the evaluation-mask over the identified different pixels on the modified image; and
responsive to receiving an evaluation score that meets or exceeds a predetermined threshold, program instructions to authenticate a user and grant the user access to data or other resources.

16. The computer program product of claim 15, wherein the comparison of the response from the user with the evaluation-mask comprises:
program instructions to compare pixels in the original image with pixels of the modified image in relation to the response from the user.

17. The computer program product of claim 15, further comprising:
program instructions to generate, by the GAN, the modified image from the original image, wherein generating the modified image comprises:
program instructions to edit the original image, wherein editing comprises at least one of: changing objects, people, colors, brightness, peoples ages, changing walls, changing clothes, and fashion in the original image.

18. The computer program product of claim 15, wherein the displaying the modified image as a multi-factor authentication prompt to the user further comprises:
program instructions to issue a responsive prompt instructing the user to identify the one or more modified items or areas in the modified image by tapping, drawing, or clicking on the one or more modified items or areas in the modified image.

19. The computer program product of claim 15, further comprising:
program instructions to compute the evaluation score based on a plurality of response attempts from the user to validate an identification of the user, wherein the plurality of response attempts are based on a plurality of security prompts, each using a different modified image selected from a plurality of modified images.

20. The computer program product of claim 15, further comprising:
program instructions to display the modified image as a multi-factor authentication prompt to a user, wherein the user is prompted to provide a response that identifies one or more modifications in the modified image; and
program instructions to compute an evaluation score based on a comparison of the response from the user with the evaluation-mask, to validate the response from the user.

* * * * *